United States Patent Office 3,520,848
Patented July 21, 1970

3,520,848
HEAT-HARDENABLE MOLDING COMPOSITION HAVING AS A BASIS AROMATIC DIGLYCIDYL ETHERS
Hermann Delius, Ahrensburg, Holstein, Wilhelm Becker, Hamburg-Billstedt, and Hans-Joachim Kiessling, Hamburg-Sasel, Germany, assignors to Reichhold Chemicals, Inc., White Plains, N.Y.
No Drawing. Filed Feb. 23, 1967, Ser. No. 617,791
Claims priority, application Germany, Apr. 2, 1966,
R 42,995
Int. Cl. C08g 30/12, 30/14
U.S. Cl. 260—47    5 Claims

ABSTRACT OF THE DISCLOSURE

Heat-hardenable molding composition having as a basis a diglycidyl ether and a hardening agent which is characterized in that said composition contains the following components:

(a) a diglycidyl ether having the general formula

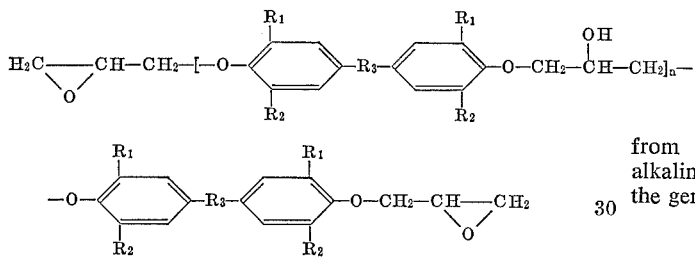

wherein $n=0$ or a whole number between 1 and 20, $R_3$ represents the radicals

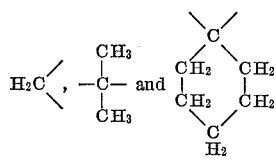

$R_1$ and $R_2$ represent aliphatic radicals selected from a group consisting of methyl, ethyl, n- and isopropyl, n-, iso-, sec.- and tert.-butyl, n- and isoamyl, n- and isooctyl, and n- and isononyl radicals, and (b) as a hardening agent at least one heat-hardening compound selected from a group consisting of acid anhydrides, aromatic polyamines, and borontrifluoride complexes selected from a group consisting of borontrifluoride monoethylamine, borontrifluoride-2,4-dimethylaniline, and borontrifluoride-benzylamine, components (a) and (b) being employed in substantially the proportion of 1 mol of (b) for each epoxy equivalent of (a).

---

The present invention relates to a molding composition having as a basis aromatic diglycidyl ethers and hardening agents. It is characterized in that said composition contains as components:

(a) as diglycidyl ethers those having the general formula

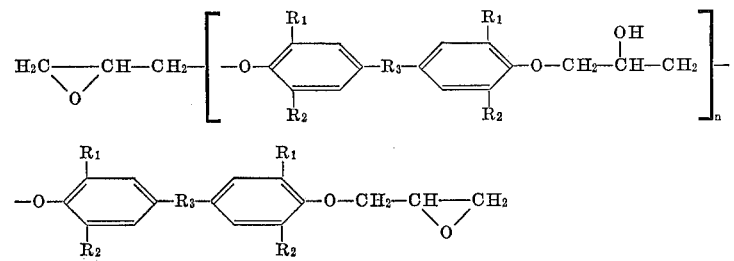

wherein $n=0$ or a whole number between 1 and 20, $R_3$ represents the radicals

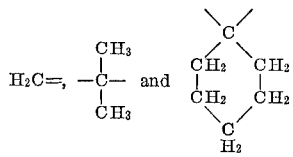

$R_1$ and $R_2$ represent the same or different straight- or branched chain aliphatic radicals, such as methyl, ethyl, n- and isopropyl, n-, iso-, sec. and tert.-butyl, n- and isoamyl, n- and isooctyl, as well as n- and isononyl radicals, and (b) as hardening agent one or more heat-hardening compounds such as acid anhydrides and/or aromatic polyamines and/or borontrifluoride complexes.

The novel aromatic diglycidyl ethers contained in the molding composition of the present invention are prepared in accordance with processes that are known per se from epichlorohydrin and/or glycerodichlorohydrin in alkaline solution and tetrasubstituted bisphenols having the general formula

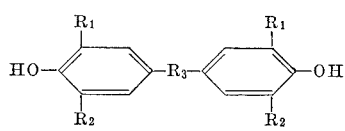

wherein $R_1$, $R_2$ and $R_3$ have the same significance as above. Depending upon the mole ratio of substituted bisphenol/epichlorohydrin and the type of substituted bisphenols used, it is possible to obtain liquid, semisolid or solid diglycidyl ethers. The epoxide equivalent weights of these products lie between 200 and 4000. In the molding composition according to the present invention, it is preferred to use low molecular weight members, i.e. liquid, semi-solid and low-melting solid products having melting points up to 100–120° C. according to Durran and epoxide equivalent weights between 200 and 1500.

Starting compounds for the aromatic diglycidyl ethers to be used in accordance with the present invention are tetrasubstituted bisphenols with phenolic hydroxyl groups in 4- and 4'-position. The aliphatic substituents in the claimed compounds are in 3,3'- and 5,5'-position.
Examples of these are:

4,4'-dioxy-3,3',5,5'-tetramethyl-diphenylmethane;
4,4'-dioxy-3,3',5,5'-tetramethyl-diphenyl-2,2-propane;
4,4'-dioxy-3,3',5,5'-tetra-p-tert.-butyl-diphenyl-methane;
4,4'-dioxy-3,3',5,5'-tetra-p-tert.-butyl-diphenyl-2,2-propane;
4,4'-dioxy-3,3'-dimethyl-5,5'-di-p-tert.-butyl-diphenyl-methane;

4,4′-dioxy-3,3′-dimethyl-5,5′-di-p-tert.-butyl-diphenyl-2,2-propane;
4,4′-dioxy-3,3′,5,5′-tetra-p-tert.-butyl-diphenyl-cyclohexane;
4,4′-dioxy-3,3′-dimethyl-5,5′-di-p-tert.-butyl-diphenylcyclohexane.

The tetrasubstituted bisphenols are easily obtained by acid condensation of the corresponding phenols substituted in 2,6-position with aldehydes or ketones. Among the compounds indicated as being suitable, it is preferred to use the following:

4,4′-dioxy-3,3′,5,5′-tetramethyl-diphenylmethane and
4,4′-dioxy-3,3′,5,5′-tetramethyl-diphenyl-2,2-propane.

It has already been proposed to use bisphenols having as substituents four alkyl radicals, for example, as antiagers for rubber. Seen in this regard Paquin, "Epoxide Compounds and Epoxide Resins," Springer Publ., 1958, pages 269–273, or British Pat. 719,101 and U.S. Pat. 2,733,100. The compounds described in these publications are bisphenols wherein the phenolic hydroxyl is in a vicinal position to the bridging carbon atom. Because of this structure of the bisphenols, the diglycidyl ethers prepared therefrom by reaction with epichlorohydrin or diglycerodichlorohydrin, upon being hardened were found to have greatly inferior properties to those commercial products obtained from 4,4′-dioxydiphenyl-2,2-propane. Moreover, the bisphenols described in the literature with the OH-groups in 2,2′-position are for the most part much less accessible than bisphenols tetrasubstituted in 3,3′- and 5,5′-position with the OH-groups in 4- and 4′-position which serve as a basis for the diglycidyl ethers to be used in accordance with the present invention.

In the mixture according to the present invention, it is possible to use as hardening agents, per se or mixed with one another, compounds having a thermosetting action and, more particularly acid anhydrides such as phthalic acid anhydride, tetrahydro-phthalic acid anhydride, hexahydrophthalic anhydride, endomethylene - tetrahydrophthalic acid anhydride, hexachloroendo-methylene-tetrahydro-phthalic acid anhydride, methylendomethylene-tetrahydro-phthalic acid anhydride, the methyl derivatives of tetra- and hexahydro-phthalic acid anhydride, succinic acid anhydride, dodecenyl-succinic acid anhydride, maleic acid anhydride, pyromellitic acid dianhydride, benzophenone-tetracarboxylic acid dianhydride, and/or aromatic polyamines such as m-phenylene-diamine, 4,4′-diaminodiphenylmethane, 4,4′ - diaminodiphenylsulfone, 4,4′-diaminodiphenyl oxide and condensates of aniline and formaldehyde in acid solution and/or borontrifluoride complexes such as $BF_3$-monoethylamine, $BF_3$-2,4-dimethylaniline, $BF_3$-benzylamine.

The molding composition according to the present invention can find technical applications in various forms, e.g. as resinous casting materials for the preparation of electrical insulating materials for casting or incapsulating electrical parts such as coils, condensers, rotors, etc. or in combination with glass cloth webs for the manufacture of so-called glass reinforced laminates, and in the form of molding compounds. To reduce the cost, it is possible to add fillers such as quartz powder, shale powder, talc, chalk, dolomite, ground corundum or silicon carbide, asbestos and barite. In order to improve the mechanical resistance of the cured compositions there can be used, if necessary, woven glass fiber products or glass fiber mats or chopped glass fiber rovings.

The curing of the molding composition according to the present invention takes place upon heating at temperatures between about 80 and 220° C., preferably between 100 and 150° C. The hardening periods may extend from a few minutes up to 20 hours. In order to shorten the hardening period it is possible, if necessary, to add so-called hardening accelerators in quantities between 0.05 and 2% by weight. Suitable accelerators are polyalcohols, such as glycol, glycerin or trimethylol-propane, phenols such as phenol or bisphenol A and, more particularly, tertiary amines such as dimethylbenzylamine or tris-(dimethylaminomethyl-) phenol.

The surprising discovery was made that the molding compositions according to the present invention, containing aromatic diglycidyl ethers having as a basis tetrasubstituted bisphenols, although displaying approximately the same satisfactory properties as molding compositions that contain diglycidyl ethers having as a basis bisphenol A, are distinguished from the latter by their greatly superior thermal resistance or resistance to aging due to heat. Cured molding compositions having as a basis commercial diglicidyl ethers derived from 4,4′-dioxydiphenyl-2,2-propane, when subjected to a prolonged thermal treatment, suffer a substantial decrease of their mechanical properties, whereas the hardened products according to the present invention, upon being subjected to the same thermal treatment, were found to have suffered a much smaller reduction and, in some cases, an improvement of their mechanical properties.

An epoxide resin binder having superior aging resistance upon being heated is of particular interest in the electrical industry since the use of such resins as insulating materials makes it possible to greatly increase the output as well as the life of electrical machines.

EXAMPLE 1

Preparation of the starting products 283 gr. of 4,4′-dioxy-3,3′,5,5′-tetramethyldiphenyl-2,2-propane are dissolved in 1248 gr. of epichlorohydrin and heated in an apparatus equipped for recycling distillation to a temperature from 111 to 115° C., while stirring. In this temperature range there are added dropwise 152 gr. of caustic soda (50% by weight). The addition is controlled in such a way that a distillate of water and epichlorohydrin having a vapor transition temperature of 104 to 107° C. continuously passes over. The lower phase of the condensed distillate, which consists mainly of epichlorohydrin, is continuously returned to the reaction vessel. It is important never to have more than 1% water present in the reaction mixture itself. The caustic soda residues are rinsed out with 2 gr. of water. Upon terminating the addition of caustic soda, the excess epichlorohydrin is distilled off, at first under normal pressure, later on under reduced pressure, at 140° C., and finally under a complete vacuum. Heating is continued up to 150° C., this temperature being maintained for 1 hour under a complete vacuum. Upon cooling to 110° C., the vacuum is lifted and 425 gr. of xylene and thereafter 452 gr. of water are added. Heating is resumed and at 60 to 70° C. there is added a mixture of 9.3 gr. of caustic soda (50% by weight) and 9.3 gr. of water, whereupon heating is continued to 93° C. and the whole is held at this temperature for 75 minutes. At this point the pH is adjusted at a value from 6.5 to 8.0 by the addition of a 33% by weight solution in water of $NaH_2PO_4$. After arriving at the desired pH range, the aqueous phase is separated. The remaining water is removed from the mixture by recycling distillation. This is followed by concentration of the mixture until the vapor transition temperature at 380 to 390 mm. Hg is 110° C. After this, diatomite is added and the whole is subjected to filtration. The clear filtrate is now concentrated in a clean flask, and starting from 140° C. under a complete vacuum. The temperature is held for another 2 hours under a complete vacuum. After cooling to 135° C., further diatomite is added which is followed by renewed filtration. There are obtained 410 gr. of a resin having an epoxide equivalent weight of 222 and a Gardner-Holdt viscosity, in 70% butylcarbitol, of K–L.

Preparation of the starting material for the comparative test

An epoxide resin obtained from bisphenol A was prepared in the same way. Instead of 283 gr. of 4,4'-dioxy-3,3',5,5'-tetramethyl-diphenyl-2,2 - propane, there were added 228 gr. of bisphenol A. The epoxide equivalent weight was found to be 190, the Höppler-viscosity of the undiluted resin at 25° C. amounted to 8000 cp.

Preparation of test plates 400 parts of the resin having as a basis 4,4'-dioxy-3,3',5,5'-tetramethyl-diphenyl-2,2-propane
277 parts hexahydrophthalic acid anhydride (pre-dried for 2 hours under a vacuum at 150° C.)
were mixed together at 80° C. and treated with 0.8 parts of tris-(dimethylaminomethyl) phenol.

The mixture, which was thoroughly stirred and free of bubbles, was poured on a plate. It was then hardened in an oven for 2 hours at 80° C. and for 2 hours at 120° C. In the same way, a test plate was prepared using the bisphenol A resin, the ratio of the mixture being 400 parts by weight of resin (component (a)) to 320 parts by weight of hexahydrophthalic acid anhydride (component (b)).

It will be noted from the above that components (a) and (b) are employed in the proportion of approximately 1 mol of (b) for each epoxy equivalent of (a) as is well known in the art.

RESULT OF THE TESTS

|  | O-value | Aging during 3 weeks 160° C. |
|---|---|---|
| (a) Molding composition having as a basis the bisphenol A resin: |  |  |
| Flexural strength (kp/.cm.²) | 1,360 | 1,100 |
| Bend at point of breaking (cm.) | 0.75 | 0.65 |
| Martens degree (° C.) | 96 | 119 |
| (b) Molding composition according to the present invention having as a basis the resin obtained from 4,4'-dioxy-3,3',5,5'-tetramethyl-diphenyl-2,2-propane: |  |  |
| Flexural strength (kp./cm.²) | 1,190 | 1,500 |
| Deflection at ultimate flexural strength (cm.) | 0.5 | 1.0 |
| Martens degree (° C.) | 97 | 110 |

EXAMPLE 2

Preparation of the starting product 526 grams of dihydroxy-3,3',5,5'-tetramethyl-diphenyl-2,2'-methane are dissolved in 2700 grams of epichlorohydrin and heated to 111–115° C., while stirring, in an apparatus equipped for recycling distillation. In this temperature range there are added drop by drop 328 grams of soda lye (50% by weight). The addition is adjusted in such a way that a distillate consisting of water and epichlorohydrin at a vapor transition temperature of 104–107° C., continuously passes over. The lower phase of the condensed distillate, consisting mainly of epichlorohydrin, is continuously returned to the reaction vessel. In the reaction mixture itself, the should never be present more than 1% of water. Upon terminating the addition of soda lye, the excess epichlorohydrin is distilled off, first under normal pressure, then under reduced pressure and finally under a complete vacuum. The heating is continued up to 150° C. and the whole is held at this temperature for one hour under a complete vacuum. After cooling to 110° C. the vacuum is lifted and 920 grams of xylene and, immediately thereafter, 660 grams of water are added. Heating is resumed and at 60–70° C. there is added a mixture consisting of 20 grams of soda lye (50% by weight) and 20 grams of water, whereupon heating is continued up to 93° C. and the whole is held at this temperature for 75 minutes. At this point the pH value is adjusted to 6.5 to 8.0 with a 33% by weight solution of $NaH_2PO_4$ in water. After arriving at the desired pH range, the aqueous phase is separated.

The residual water is removed by recycling distillation. Directly after this, the concentration is carried out to a point at which the vapor transition temperature at 380–390 m. Hg amount to 110° C. The product is then mixed with 10 grams of Kieselgur and filtered. The clear filtrate is concentrated in a clean vessel under reduced pressure and, beginning at 140° C., under a complete vacuum. It is then cooled down to 135° C. whereupon another 10 grams of Kieselgur are added followed by renewed filtration. There are obtained in this manner 740 grams of resin having an epoxide equivalent weight of 192 and a Höppler viscosity (100% resin measured at 25° C.) of 57,330 cp.

Preparation of test plates 348 parts of the resin having as a basis 4,4'-dihydroxy-3,3',5,5'-tetramethyl-diphenylmethane according to Example 2 (component (a)) and 308 parts of hexahydrophthalic anhydride (component (b)) (predried at 150° C. under a vacuum for 2 hours) were mixed at 80° C. and treated with 0.77 part of tris-(dimethylaminomethyl) phenol. The thoroughly stirred mixture, which was free of bubbles, was poured into the plate molds. The mixture was then oven-dried for 2 hours at 80° C. and for 2 hours at 120° C. Here again components (a) and (b) are employed in the proportion of approximately 1 mol of (b) for each epoxy equivalent of (a).

We claim:

1. Heat-hardenable molding composition having as a basis a diglycidyl ether and a hardening agent which is characterized in that said composition contains the following components:

(a) a diglycidyl ether having the formula

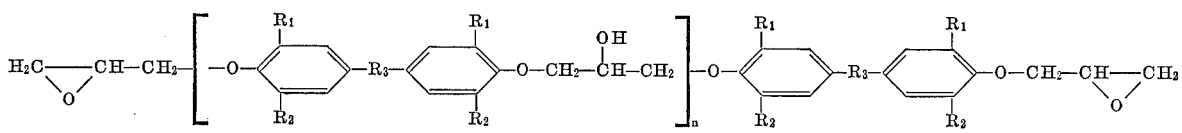

where $n=0$ or a whole number between 1 and 20, $R_3$ represents the radicals

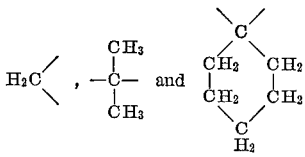

$R_1$ and $R_2$ represent aliphatic radicals selected from a group consisting of methyl, ethyl, n- and isopropyl, n-, iso-, sec.- and tert.-butyl, n- and isoamyl, n- and isooctyl, n- and isononyl radicals, and (b) as a hardening agent at least one heat-hardening compound selected from a group consisting of acid anhydrides, aromatic polyamines, and borontrifluoride complexes selected from a group consisting of borontrifluoride, monoethylamine, borontrifluoride-2,4 - dimethylaniline, and borontrifluoride - benzylamine, components (a) and (b) being employed in substantially the proportion of 1 mol of (b) for each epoxy equivalent of (a).

2. The composition defined in claim 1 including in addition a filler.

3. A composition as defined in claim 1 including in addition a hardening accelerator selected from a group consisting of polyalcohols, phenols and tertiary amines.

4. A composition as defined in claim 1 including in addition a filler and a hardening accelerator selected from a group consisting of polyalcohols, phenols and tertiary amines.

5. A composition as defined in claim 1 wherein component (b) is an acid anhydride and components (a) and (b) are used in substantially the proportion of 1 mol of (b) for each epoxy equivalent of component (a).

References Cited
UNITED STATES PATENTS

| | | |
|---|---|---|
| 2,723,241 | 11/1955 | De Groote et al. |
| 2,801,229 | 7/1957 | De Hoff et al. |
| 3,305,528 | 2/1967 | Wynstra et al. |

WILLIAM H. SHORT, Primary Examiner

T. E. PERTILLA, Assistant Examiner

U.S. Cl. X.R.

161—185; 260—37